Dec. 26, 1961  W. GAGG ET AL  3,014,649
FIRING PRINCIPLES CALCULATOR
Filed Aug. 30, 1956  7 Sheets-Sheet 1

INVENTORS
Walter Gagg
and
Oskar Eberhard
BY: Michael S. Striker
Agt.

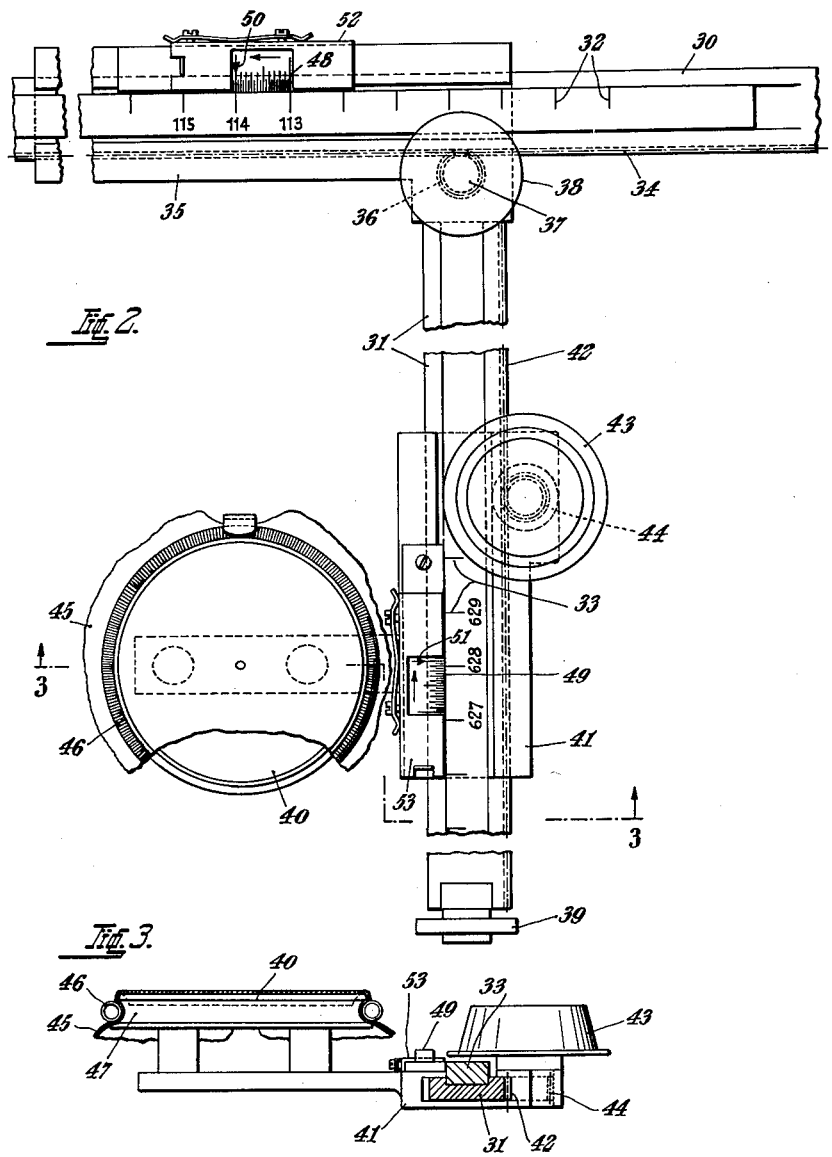

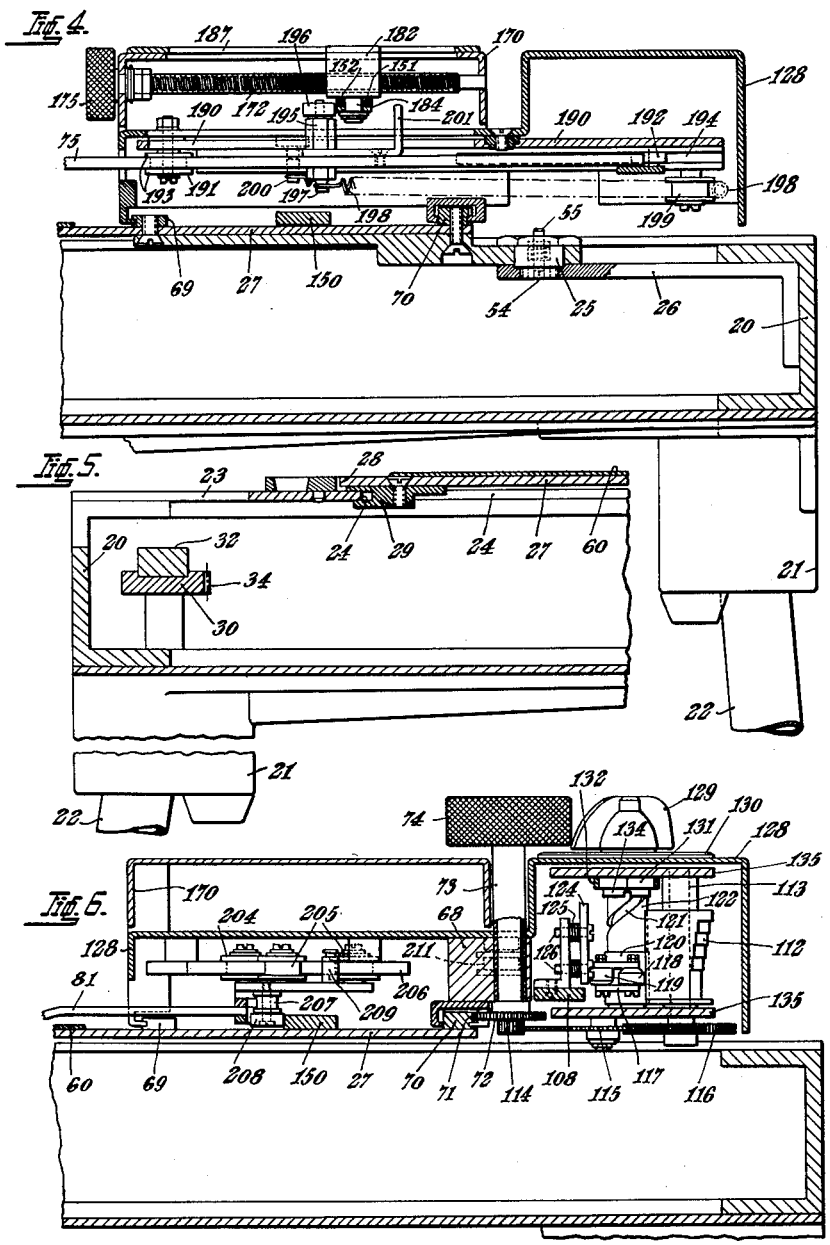

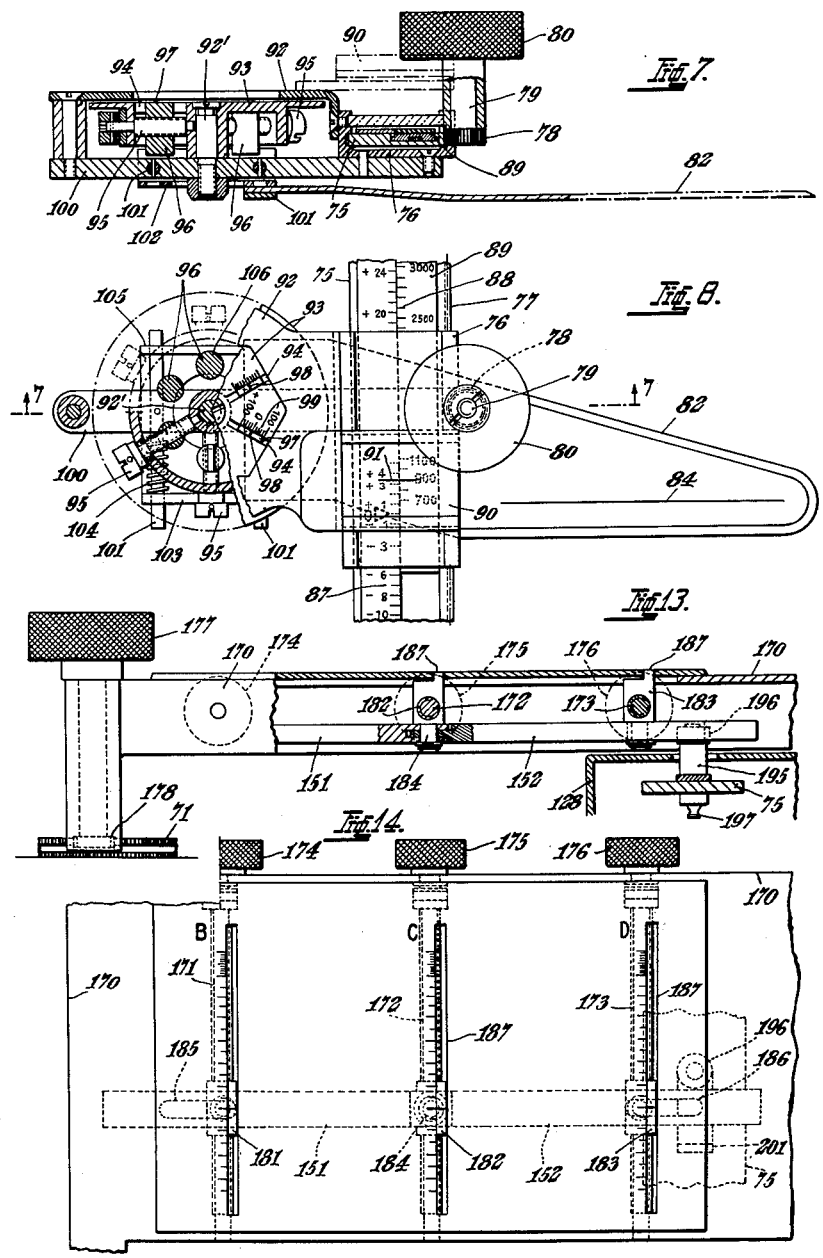

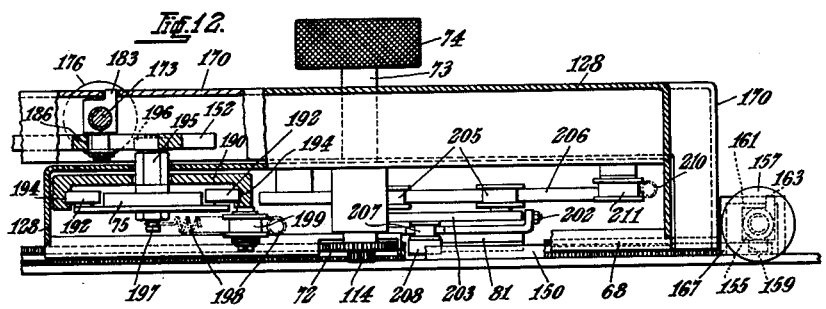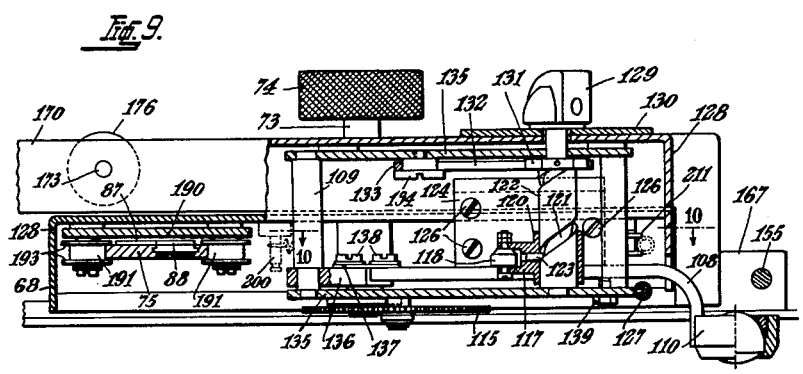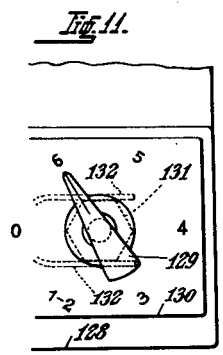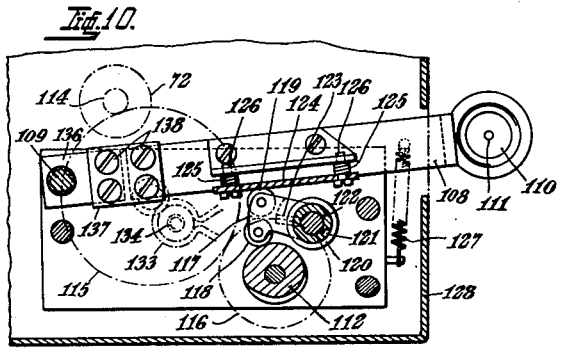

Dec. 26, 1961   W. GAGG ET AL   3,014,649
FIRING PRINCIPLES CALCULATOR
Filed Aug. 30, 1956   7 Sheets-Sheet 6

INVENTORS
Walter Gagg
and
Oskar Eberhard
BY: Michael S. Striker
Agt.

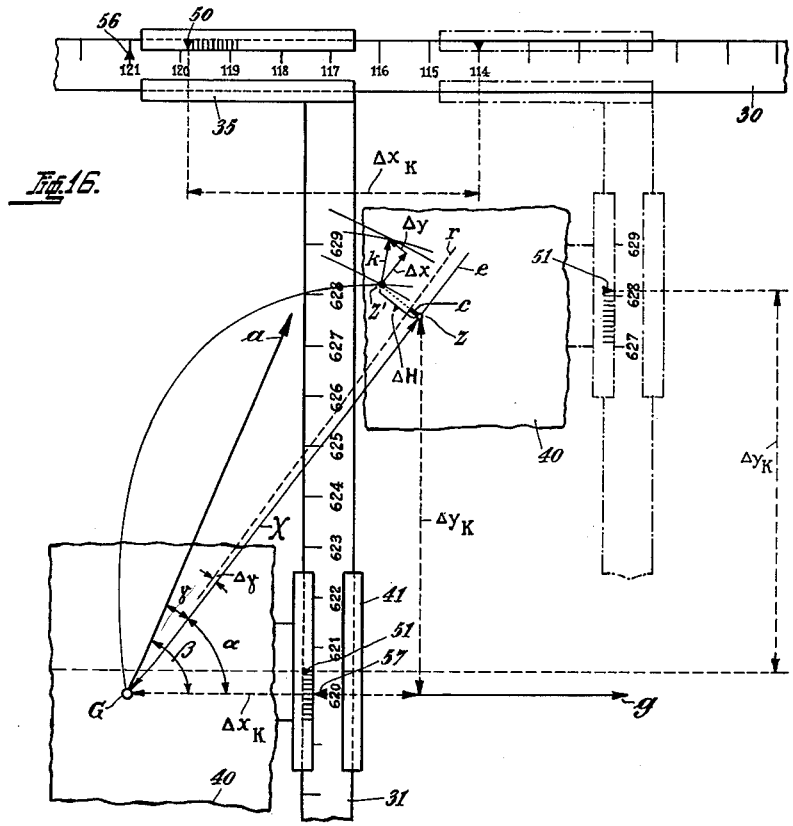
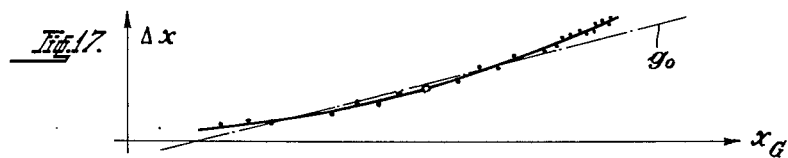
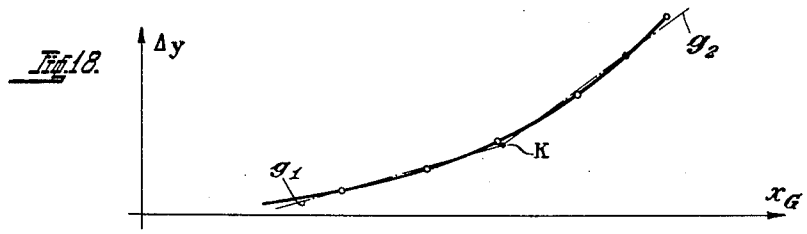

United States Patent Office 3,014,649
Patented Dec. 26, 1961

3,014,649
FIRING PRINCIPLES CALCULATOR
Walter Gagg, Bern, and Oskar Eberhard, Wabern, near Bern, Switzerland, assignors to Xamax A.G., Zurich, Switzerland
Filed Aug. 30, 1956, Ser. No. 607,126
Claims priority, application Switzerland Sept. 14, 1955
10 Claims. (Cl. 235—61.5)

This invention relates to a firing principles calculator with a plane firing-table diagram formed by a network of trajectory and flight-time curves, the abscissa axis of which represents the horizontal distance and the ordinate axis the level difference between gun and target and which is capable of being turned with the abscissa axis into the direction of the horizontal projection of the line of fire and is laid over about this axial direction into the horizontal projection plane, and with two pointers extending in the plane of the diagram, each parallel to one co-ordinate axis of the diagram and adjustable in the direction of the other co-ordinate axis, which intersect one another and the point of intersection of which fixes the determinative diagram values. Firing principles calculators of this kind make possible as it were a geometrical correct side-angle reproduction of the positions of gun and target and from it a purely mechanical locating of elevation and timing from the firing-table diagram. The customary firing tables are, however, based on a normal initial velocity of the projectile and a normal air density, which in reality are subject to variations, the actual initial velocity being determined by the barrel wear, the momentary temperature of the powder charge, the kind of powder and its age and the actual air density, by the air pressure, the air temperature and the air moisture. The deviations from the normal values, on which the firing tables are based, that is to say the disturbing influences, have hitherto had to be allowed for by computation as regards their effect on elevations and timing, which involved considerable dangers of error.

According to the present invention, in order to allow for disturbing influences not provided for in the firing table diagram, each pointer is provided with a correcting device with linear guiding means, which is adjustable in a plane parallel to the plane of the diagram and to which the pointer in question is contiguous, so that the adjusting motion of the guiding means automatically produces a correcting motion dependent on it of the pointer in question in the direction of motion peculiar to it.

An embodiment of the firing principles calculator according to the invention shall now be described in detail by way of example, with reference to the accompanying drawings, in which:

FIG. 2 is a plan view of the graduated co-ordinate straight edges and the position table of the appliance, to a larger scale than FIG. 1;

FIG. 3 shows a cross-section on line 3—3 of FIG. 2;

Figure 1:
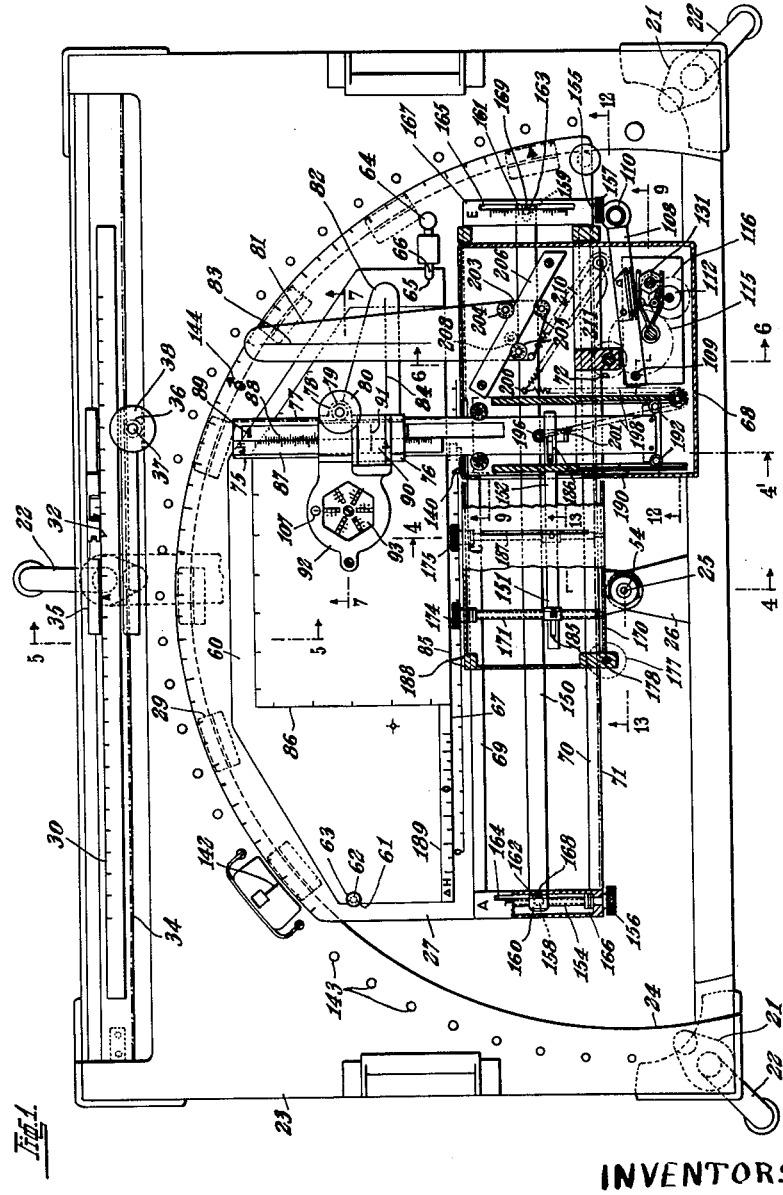
FIG. 1 shows a plan view of the appliance, with parts in horizontal section.
Figure 15:
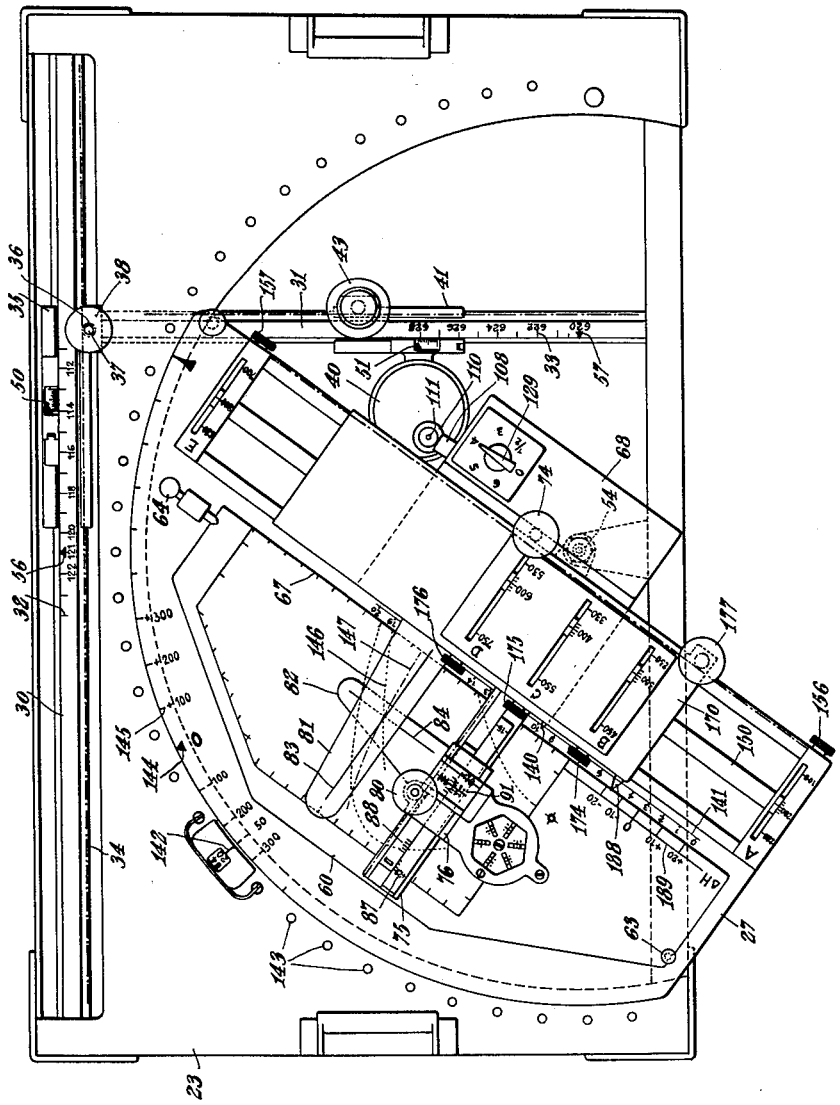

FIGS. 4 to 7 each show a vertical section on line 4—4 and 4'—4', line 5—5 and line 6—6 respectively of FIG. 1 and line 7—7 of FIGS. 1 and 8;

FIG. 8 is a plan view of FIG. 7, with parts in horizontal section;

FIG. 9 shows a vertical section on line 9—9 of FIG. 1;

FIG. 10 shows a horizontal section on line 10—10 of FIG. 9;

FIG. 11 is a partial plan view of FIG. 9;

FIG. 12 shows a vertical section, substantially on line 12—12 of FIG. 1;

FIG. 13 shows a vertical section on line 13—13 of FIG. 1;

FIG. 14 is a plan view of FIG. 13;

FIG. 15 shows an operative position of the appliance in plan view;

FIG. 16 is a representation of the position geometry, with the projectile trajectory laid over into the planimetric plane, and FIGS. 17 and 18 show correction components diagrams.

The firing principles calculator is based as regards its constructional lay-out on the principle of scale-reduced, geometrical reproduction and mechanical determination of the position of gun or plurality of guns and target on the one hand in the horizontal plane, making use of the position co-ordinates according to the topographic map and, on the other hand, in the trajectory plane in accordance with the difference in level between gun and target.

The appliance comprises on a horizontal, rectangular frame 20, which is provided on sockets 21 with three insertable legs 22 (FIGS. 1, 4 and 5), a table board 23 with a circular table edge 24 (FIG. 1) bounding a cutaway portion. About a pivot 25 perpendicular to the plane of the table 23 and passing through the center of the circular table edge 24 (FIG. 4) and, supported by an arm 26 projecting inwards from the frame 20 there is rockable a turntable 27 which with its circular edge 28 centered on the pivot axis overlaps the table 24 and is supported on the latter by means of a U-shaped slide 29 fixed to the under side of the turntable, between the limbs of which, consisting for instance of synthetic material, the table edge 24 engages (FIG. 5).

For fixing gun and target positions in the horizontal plane parallel to the plane of the table board 23, the appliance has, two co-ordinate straight-edges 30 and 31 with like longitudinal graduation 32 and 33 respectively (FIGS. 2, 3, 5 and 15), which are at right angles to one another and of which the former is fixed to the frame 20 parallel to its longitudinal side and is provided at its longitudinal side with rack teeth 34. The other straight edge 31 is fixed at one of its ends to a slide 35 which is guided on the first straight edge 30 and which by turning a pinion 36 meshing with the teeth 34 by means of a knob 38 fixed to the pinion pivot 37 can be displaced, taking along with it the straight edge 31 which is supported at the other end by means of a roller 39 resting on the frame 20. A slide 41 provided with a position table 40 is guided on the straight edge 31 which is provided with rack teeth 42 and is displaceable by means of a knob 43 by way of a pinion 44 engaging in the rack teeth 42.

The position table 40 (FIGS. 2 and 3) has a flat, circular surface which may be regarded as lying in the horizontal base plane and is formed by a plate of a rubber or linoleum material, for allowing a puncturing point to penetrate, and which, when in use, is covered with an exchangeable paper sheet 45 held in position by a clamping ring 46 consisting of a helical spring in a lateral groove 47 provided laterally at the table periphery. The two slides 35 and 41 are provided on their upper side each with a decimal graduation 48 and 49 respectively, which starting from a zero mark 50 and 51 respectively has equal decimal subdivisions which are numbered ascendingly in both directions of displacement of the appropriate slide over one co-ordinate unit length, a covering slide 52 and 53 respectively being provided, with which optionally one or other of the two graduations starting from the zero mark 50 and 51 respectively can be covered, according to whether the longitudinal graduation 32 or 33 of the straight edges 30 and 31 is to give ascending co-ordinate values in one longitudinal direction or the opposite one (FIG. 15).

In the hollow pivot 25 (FIG. 4), coaxial with it, is a puncturing spike 54 with a press knob 55, by means of which, through depressing the knob in opposition to a spring, puncturing marks can be made on the paper surface of the position table 40, as it is displaced under this spike, in the case to be described later.

On the turntable 27 and therefore practically in the horizontal projection plane is fixed a plane firing table 60 (FIGS. 1 and 15), so as to be exchangeable, with a diagram formed of flight curves and flight time curves, this table bearing at one end with the edge of a recess 61 provided on it laterally against a pin 62 projecting over the turntable and being overlapped by the head 63 of the pin, whilst at the other end a spring-loaded finger 65, which can be withdrawn by a knob 64, engages in a similar manner in a recess 66 formed by the table edge and engages over this edge. Parallel to the straight-line base edge 67 of the table 60 a sliding member 68 is guided in a straight line on two rails 69 and 70 fixed on the turntable 27, of which the latter, 70, has rack teeth 71 along one longitudinal side, with which a pinion 72 meshes, which is rotatable by way of a pivot 73 by means of a knob 74 for the purpose of displacing the sliding member 68. This sliding member has an outrigger rail 75 which extends parallel to the plane of the table and at right angles to the direction of displacement of the sliding member across the table 60 and is provided with a slide 76 guided on it, which can be displaced by a pinion 78 engaging in a longitudinally extending rack 77 of the rail 45 by means of a rotatable knob 80 mounted on the pinion pivot pin (FIGS. 7 and 8).

On each of the slides 68 and 76 is a flat, transparent pointer arm 81 and 82 respectively, made for instance of unbreakable glass, which is arranged in a manner to be further explained below to be displaced with respect to the appropriate slide 68 and 76 respectively and is provided with a straight hairline 83 and 84 respectively. The pointer rams 81 and 82 lie crosswise one over the other on the table 60, the hairline 83 of the hairlines 83 and 84, which intersect in plan view, extending perpendicular to the abscissa 85 coinciding with the base edge 67 of the table 60 and the hairline 84 perpendicular to the ordinate 86 of the firing table diagram.

In the longitudinal direction of the outrigger rail 75 there is fixed on its upper side a scale 87 of the height differences ΔH between target and gun and there is provided a scale 88 of the effective height values H on a longitudinally slidable straight edge 89 guided on the rail 75. The scale 87 corresponds to that at the ordinate 86 of the diagram. A magnifying glass 90 with an index line 91 fixed to the height slide 76 crosses the two scales 87 and 88.

For enabling one setting of the height slide 76 to be used in case of need for a plurality of guns, for instance six coacting guns, even when their positions are at a different height, the slide 76 has an adjusting device 92 (FIGS. 7 and 8) with an indexing disc 93 which is rotatable about an arbor 92' perpendicular to the ordinate direction 86 and which has six radially extending guiding slots 94 in symmetrical star arrangement and below it, parallel to each slot an adjusting screw 95 which is screwed through a pin 96 which is axis parallel to the indexing disc 93 and is guided at its end in the associated slot 94. At the upper side of the pin end 97 guided in the slot 94 there is an index line 98 and on the turntable longitudinally of the slot a scale 99 of height differences to the same scale as the scale 87, for instance within the limits of +100 meters to −100 meters, at which, by turning the screw 95, the height difference of the particular gun can be set with respect to the adjusted value of the height slide 76. A supporting arm 100 of the slide 76 is traversed by two parallel guiding rods 101 fixed in it, on which a U-shaped support 102 rigidly connected with the elevation indicator arm 82 is slidable in the direction of motion of the slide 76 and is held by means of helical springs 104 provided on the rods 101 between the supporting arm 100 and one of the support limbs 103 in contact with the other supporting limb 105 against that pin 96 which in the effective, determining position engages in a notch 106 provided on the support limb 105 (FIG. 8). The indexing disc 93 has for each slot 94 an ordinal number, for instance 1 to 6 which is visible in the effective position of the associated pin 96 in a round window 107 (FIGS. 1 and 15).

The slide 68 also carries at the free end of a lever arm 108 (FIGS. 9 and 10), which is supported so as to swivel about a pin 109 which is perpendicular to the plane of the table 23, a circular magnifying glass 110 with a circular mark 111 about its circle center, which is used in ascertaining by means of the turntable 27, in a manner to be explained later, the azimuth necessary for the gun. The slewing of the magnifier arm 108 is effective in dependence on the target distance and the charge so as to include in ascertaining the side-angle the drift (deflection to the right, due to the projectile rotation). In the device serving this purpose there is a cam body 112 with its axis of rotation 113 parallel to the pin 109, which is turned by the pinion 72 of the rotary slide knob 74 by way of toothed wheel gearing 114, 115, 116 in dependence on the displacement of the slide. The cam body 112 has in the vertical direction six zones with a pre-determined differing course of the deflecting curve, corresponding to different charges, for instance, the uppermost zone for charge 6, the next zone for charge 5 and so on, the lowest-but-one for charges 1 and 2 and the lowest zone for charge 0 (FIGS. 6 and 11).

For scanning the momentary radius of any of the deflecting curves of the cam body 112 and for transmission to the slewable arm 108 there is provided a roller carrier 117 (FIGS. 6 and 10) with two rollers 118 and 119, which is supported with the bush 120 so as to be rotatable and slidable axially on a spindle 122 which is parallel to the pin 109 and is provided with a steep, helical guiding groove 121, and by means of a driving pin 123 engages in the groove 121. The roller 118 makes contact with the periphery of the cam body 112 and is tapered conically towards its upper end surface, whilst the roller 119 bears against a plate 124 which is parallel to the pin 109, extends in the longitudinal direction of the swivelling arm 108 over a height corresponding to the six zones of the cam body and is supported against the swiveling arm 108 by means of helical springs 125 on screws 126. A helical spring 127 attached to the swivelling arm 108 keeps the plate in yielding contact with the roller 119 and the roller 118 in yielding contact with the cam body 112. The upper end of the spindle 122 carries on that part of it, which projects above the casing cover 128 of the slide 68, a rotatable knob indicator 129 (FIG. 11) above a plate 130 indicating the indexing positions according to charges 0 to 6 and below the casing cover 128 a hexagonal disc 131, against the periphery of which the two free limbs 132 of a fork-shaped control spring 133 bear, the spring being mounted by means of a screw 134 on the frame 135 of the device, fixed to the casing cover 128. The swivelling arm 108 is secured on an arm piece 136 fixed to the pin 109 (FIGS. 9 and 10) by way of a leaf spring 137 by means of screws 138, so as to spring in the axial plane and rests on a set screw 139 screwed into the frame 135, by means of which the distance of the magnifying glass 110 from the surface of the position table 40 can be adjusted.

For elucidating the adjustment procedure of the appliance when ascertaining the firing elements "side angle," "elevation" and "timing," first of all without carrying out corrections to allow for disturbing influences, let it be assumed that from the Cartesian co-ordinate network of the topographic map there are known, for instance for the gun position the co-ordinate values 119.850/620.500 and the height 540 meters and for the target position the co-ordinate values 114.000/628.100 and the height 900 meters.

With the aid of these gun and target co-ordinates the positions of gun G and target Z can be reproduced on the appliance with the use of the co-ordinate straight edges 30 and 31 arranged on it in the Cartesian manner, the position table 40 slidable along these straight edges and the fixed pivot pin of the piercing spike 54 in the horizontal plane (FIGS. 15 and 16). The contour of the position table surface is of no importance and is made circular for practical reasons only and the size of the surface is sufficient as regards the usual positioning of several guns of a battery. Through a suitable choice of a position area center with round-number co-ordinates, the positions of such a group of guns can be easily reproduced on the table surface. On the appliance the center co-ordinates are fixed by the marks 56 and 57 of the respective longitudinal graduations of the co-ordinate straight edges 30 and 31 respectively as regards position, but not numerically. The marks 56 and 57 are thereupon entered with the numerical value of the center co-ordinates, according to the example with 121.000 and 620.000 respectively, and, starting from these, the longitudinal graduations of the straight edges 30 and 31 with the consecutive co-ordinate values in such a manner that the firing sector gun-target will lie within the field of traverse of the turntable 27.

Determining for the angle of deflection and the distance gun-target are only the differences $\Delta x_K$ and $\Delta y_K$ of the $x$-co-ordinates of gun and target on the straight edge 30 and of the $y$-co-ordinates of gun and target on the straight edge 31 respectively. Thereupon, referring to the example, the zero marks 50 and 51 of the slides 35 and 41 are set to the gun co-ordinates 119.850 and 620.500 of the straight edges 30 and 31 respectively (FIG. 16) and the puncturing spike 54 is pressed down, whereby there is produced on the position table 40 the perforation which is to be regarded as the reproduction point G of the gun position. This adjustment and puncturing procedure may be repeated analogously for several guns. Thereupon, the zero marks 50 and 51 are set to the target co-ordinates 114.000 and 628.100 of the straight edges 30 and 31 respectively (shown by dot and dash lines in FIG. 16). At the same time, the position table 40 with the puncture point travels in the $x$-direction through the distance $\Delta x_K$ and in the $y$-direction through the distance $\Delta y_K$, that is in the direction $e$, through the topographical target distance X and the puncture is here to be regarded as reproduction point Z of the target in the horizontal plane. This position geometry in the horizontal plane is to be seen in FIG. 16.

The gun is aimed normally with respect to a topographic base-line direction $g$ (FIG. 16) in each case to a ready or initial direction $a$ which encloses with the base-line direction $g$ an angle $\beta$. On the appliance this initial direction can be set at a side angle scale along the table edge 24 by means of a plug marker 142 which can be inserted selectively in plug holes 143 provided in the table 23. The base line 67 of the table 60 represents in the zero position of the turn table 27, shown in FIG. 1, the basic direction $g$ and passes relatively to the latter into the initial direction $a$, when the zero mark 144 of the side angle scale 145 with the turntable 27 is set to the index of the plug mark 142. The side direction $e$ from the gun G to the target Z encloses with the base-line direction $g$ the angle $\alpha$ and with the initial direction $a$ the angle $\gamma$, $\gamma$ being equal to $\alpha-\beta$. Owing to the derivation $c$ of the projectile a direction correction of $\Delta\gamma$ is necessary, which agrees with the charge and the horizontal distance X and is allowed for on the appliance by setting the rotatable knob indicator 129, for instance to charge 4, and automatically, when displacing the distance slide 68 over the magnifier arm 108. If the magnifier 110 with its circular mark 111 be now moved by turning the turntable 27 about the pivot 25 with the puncturing spike 54 (reproduction point G) and sliding the slide 68 to the point Z of the position table 40, whereby the conditions of the position geometry according to FIG. 16 is allowed for, the base line 67 of the table 60 will move, owing to the correction already carried out by means of the rotatable knob indicator 129, into the required effective firing direction $r$. The side angle relative to the initial direction $a$ can then be read off from the plug marker 142 on the side angle scale 145 and amounts in the present example to $-250°$ whilst the horizontal distance X between gun and target may, if required, be read off at the pointer 140 of the slide 68 on the scale 141.

On the height rail 75 the sliding scale 88 is set with the height of 540 meters of the gun position to the zero stroke of the $\Delta H$ scale 87 and the height slide 76 is displaced with the reading-off stroke 91 on the scale 88 to the height of 900 meters of the target position. By this means the height difference of 360 meters between gun position G and target position Z', which can be read off on the scale 87 and can be seen in FIG. 16, by turning over into the plane of the drawing the vertical plane (firing table plane) containing the side direction $e$, is fixed and in the point of intersection of the hair strokes 83 and 84 of the pointer arms 81 and 82 respectively it is possible to read off from the network of the trajectory curves 146 and the flight time curves 147 of the firing table diagram the values for elevation and timing, in some cases by interpolation. These values apply, however, only to the normal undisturbed conditions, on which the firing table diagram is based.

The appliance is, however, arranged to take account of the disturbing influences due to the deviation $\Delta\delta$ with respect to the normal air weight and the deviation $\Delta v_0$ with respect to the rated initial velocity of the projectile. The influence of the wind is not allowed for in the appliance itself. The disturbing influences $\Delta\delta$ and $\Delta v_0$ necessitate in the firing table diagram a correction vector $k$ (FIG. 16) which can be split up into two components $\Delta x$ in the abscissa direction and $\Delta y$ in the ordinate direction. These components may be ascertained from a firing table for normal, undisturbed conditions (index N) and a firing table for disturbed conditions (index G), the procedure being as follows:

(a) The $x$-values (horizontal distances) and the $y$-values (heights) of the points of intersection of equal trajectory curves and flight time lines are sorted out and tabulated.

(b) The differences $\Delta x = x_N - x_G$ and $\Delta y = y_N - y_G$ are calculated, taking account of their signs.

(c) With $x_G$ as abscissa the $\Delta x$-values are graphically plotted as ordinate and through the points obtained a curve is traced as in FIG. 17 ($\Delta x$-diagram).

(d) With $x_G$ as abscissa and $x_G$ as ordinate the corresponding $\Delta y$-values are also plotted and the points obtained are connected by a curve as shown in FIG. 18 ($\Delta y$-diagram).

In contradistinction to $\Delta x$ the $\Delta y$-values vary greatly with $\Delta H$ (height difference between gun and target). As the curves of the $\Delta x$-diagrams are in practice very flat, they can with good approximation be replaced by a straight line, in FIG. 7 by the dot and dash straight line, it being kept in mind, that within the practical range of the particular charge the deviations from the diagram curve will be as small as possible. The curves of the $\Delta y$-diagrams can be replaced approximately by two straight lines, for instance in the manner shown in FIG. 18, the position of the kinks K, the inclination of the two straight lines $g_1$ and $g_2$ and the displacements of the kink K being so selective in dependence on $\Delta H$ that within the practical trajectory of the particular charge the deviations from the diagram curves shall be as small as possible with the different disturbing influences.

In the appliance the straight line $g_c$ is presented by the straight edge 150 and the straight lines $g_1$ and $g_2$ by two straight edges 151 and 152, which together form a knuckle joint. The straight edge 150 (FIG. 1) is made transversely displaceable in the plane of the table by means of two adjusting spindles 154 and 155 lying in the ordinate direction 86, each with a rotatable knob 156 and 157 respectively, and at each of its ends, one of which is made fork-shaped, is traversed by a vertical pin 158 and 159 respectively, which is on a runner 160 and 161 respectively mounted on the spindle 154 and 155 respectively. These runners are guided each with a projection 162 and 163 respectively in a slot 164 and 165 respectively of the spindle casing 166 and 167 respectively, which is parallel to the spindle. Along the slot the upper side of each spindle casing is provided with a scale A and E respectively and the upper side of the projections 162 and 163 each with an index mark 168 and 169 respectively. The straight edges 151 and 152 (FIGS. 1, 13 and 14) are also made transversely displaceable in a plane parallel to the plane of the table in a correction slide 170 which partially bridges the distance slide 68, for which purpose three adjusting spindles 171, 172 and 173 lying in the ordinate direction 86 are supported each with a rotatable knob 174, 175 and 176 respectively in the slide casing. The slide 170 is guided on the rails 69 and 70 and is displaceable by means of a rotatable knob 177 by a pinion 178 meshing with the rack 71. The straight edges 151 and 152 are in a manner analogous to the straight edge 150 connected by runners 181, 182 and 183 with the corresponding spindles 171, 172 and 173 respectively, the runner 182 with its pin 184 linking the two straight edges together at one of their ends and the two other straight edges 181 and 183 each passing through one of the straight edges in a slot 185 and 186 respectively provided in them. The runners, each provided with an index line, are each guided in a slot 187 of the slide 170 along a scale B, C and D respectively. An index mark 188 provided on the slide 170 serves the purpose of adjusting the slide along a ΔH-scale 189 provided in the abscissa direction on the table 60.

The height rail 75 is guided on a rail 190 fixed to the casing 129 of the distance slide 68 by means of two pairs of rollers, 191 and 192, so as to be longitudinally displaceable. The rollers 191 have each two flanges 193, between which the rail 75 is held, and are mounted each with a ball bearing at the rail 190. The rollers 192 are mounted each with a ball bearing on the height rail 75 and are guided each in a guiding groove 194 of the rail 190. A shank 195 which crosses the rail 75 and is fixed to it carries at the upper end extending into the correction slide 170 a roller 196 which, on the distance slide 68 being displaced, relative to the correction slide 170 rolls along a longitudinal side of the straight edges 151 and 152, a helical spring 189 which engages the lower end 197 of the shank 195 and which extend in view of its necessarily great length over a deflecting roller 199 mounted on the rail 190 on a holding pin 200 fixed to the slide casing 128, holding the roller 196 yieldingly in contact with the straight edge side. On the rail 75 there is a stop 201, which, should the height rail 75 with the roller 196 move away from the straight edge side, strikes against the opposite side of the straight edge.

The pointer arm 81 is attached at that one of its ends, which is in the distance slide 68, by means of two screws 202 to the carriage 203, so as to be capable of rocking about a horizontal axis, the carriage 203 being guided in a suspended manner by means of a flanged roller 204 at one longitudinal side and by means of two flanged rollers 205 at the other longitudinal side of a reversal straight edge 206 fixed to the casing 128. This carriage carries on a downwardly projecting shank 207 a roller 208 which rolls along one longitudinal side of the straight edge 150, on the slide 68 being displaced, and is held yieldingly in contact with the straight edge side by a helical spring 210 attached to a pin 209 of the carriage, which spring, in view of its requisite great length extends over an idler 211 mounted on the casing 128 to the holding pin 200.

The rollers 196, 199, 204, 205, 208 and 211 are also each provided with a ball bearing.

The taking into account of the disturbing influences Δδ and Δ$v_0$ is carried out very simply with the described appliance and is effected with the aid of tables, from which the adjusting values for the straight edges 150, 151, 152 are taken and can be set at the scales A to E by means of the spindle knobs 156, 174, 175, 176 and 157. The correction slide 170 is set with its index 188 at the scale 189 to the ΔH-value corresponding to the height difference between gun and target. Owing to this purely mechanical manipulation, the pointer arms 81 and 82 experience automatically a correction displacement by a corresponding Δx-value or Δy-value, so that it is now possible to read off in the point of intersection of the hair lines 83 and 84 the elevation and timing taking account of the disturbing influences.

While the preferred embodiment of the invention has been shown and herein described, it will be understood that the same was capable of modification without departure from the general scope and spirit of the invention as defined in the claims.

Having thus described the invention, what is claimed as new and desired to be secured by Letters Patent is:

1. A firing principles calculator comprising a plane firing table diagram formed by an abscissa axis, an ordinate axis, and by a network of trajectory and flight-time curves, the abscissa axis representing the horizontal distance and the ordinate axis representing the level difference between gun and target; means supporting said table diagram for turning movement to move the abscissa axis into the direction of the horizontal projection of a line of firing and to be moved about this axial direction into the horizontal projection plane; and two pointers extending in the plane of the diagram, each parallel to one co-ordinate axis of the diagram and adjustable in the direction of the other co-ordinate axis which intersect one another and the point of intersection of which fixes the determinative diagram values, and further comprising in order to allow for disturbing influences not provided for in the firing table diagram, a correcting device with linear guiding means for each pointer, each guiding means being adjustable in a plane parallel to the plane of the diagram and to which the respective pointer is contiguous, so that the adjusting motion of the guiding means automatically produces a correcting motion dependent on the respective pointer in the direction of motion of the same, said linear guiding means, which is associated with the pointer movable in the ordinate direction including two means having straight edges linked together at one end and being independently displaceable at the point of linkage, each of said means and said straight edges being displaceable at a further point which is spaced from said linkage point, the linear guiding means, which is associated with the pointer movable in the abscissa direction including a straight edge and being independently adjustable in ordinate direction at two spaced points.

2. A firing principles calculator, as claimed in claim 1, characterized by the feature, that the pointer which is movable in the abscissa direction along a straight-line guide extending at an inclination to the straight edge, which guide imparts to the pointer during the correction motion effected by the straight edge a motion component in the abscissa direction.

3. A firing principles calculator as claimed in claim 1, including a slide supporting the two linked straight edges, said slide being displaceable in the abscissa direction, and a scale indicating the height difference between gun and target said slide being adjustable along said scale.

4. A firing principles calculator as claimed in claim 3, including a rail which is parallel to the ordinate axis and is itself slidable in the ordinate direction and bears against the linear guiding means, said rail guiding said pointer which is movable in ordinate direction.

5. A firing principles calculator as claimed in claim 4, including a slide fixed to the inclined guiding means of the pointer which is movable in abscissa direction, said slide being guided in the abscissa direction, the guide rail of the other pointer being guided in the ordinate direction on said last-mentioned slide.

6. A firing principles calculator as claimed in claim 4, including another slide having a carrier and guided along said rail, the pointer which is movable in the ordinate direction being arranged by means of said carrier on said other slide, an elastic returning device, a rotatable member, said carrier being displaceable along said other slide in the ordinate direction in opposition to the action of said elastic returning device, drivers which can be selectively brought into engagement individually and are individually radially displaceable relatively to said rotatable member which is rotatable about an axis which is perpendicular to the ordinate direction.

7. A firing principles calculator as claimed in claim 1, comprising a turntable which is adapted to pivot about an axis perpendicular to the diagram plane, a slide which carries the two pointers and is guided in the abscissa direction on the turntable, a sighting device associated with said slide for setting the same in the manner of polar co-ordinates to any geometrical point of the horizontal plane, lying within its range of motion, at a distance from the axis of rotation.

8. A firing principles calculator, as claimed in claim 7, characterized by the feature, that the sighting device is mounted to swivel on the slide about an axis parallel to the axis of rotation of the table, an adjusting member for the sighting device having a momentary deflection arm which, acting on the sighting device, is automatically variable in dependence on the distance of the sighted point from the pivoted axis of the table and is approximately proportional to the projectile drift with a definite charge.

9. A firing principles calculator, as claimed in claim 8, characterized by the feature, that the adjusting member is constructed as a body rotating about an axis, with a plurality of deflection peripheries, each corresponding to definite charges and following one another axially, a transmission member between said body and the sighting device, said transmission member being displaceable, a shifting member for displacing said transmission member in the axial direction of the adjusting member and which in every operative position bears against one of the deflection peripheries of the adjusting member.

10. A firing principles calculator comprising a plane firing table diagram formed by an abscissa axis, and ordinate axis, and by a network of trajectory and flight-time curves, the abscissa axis representing the horizontal distance and the ordinate axis representing the level difference between gun and target; means supporting said table diagram for turning movement to move the abscissa axis into the direction of the horizontal projection of a line of firing and to be collapsed about this axial direction into the horizontal projection plane, and further comprising two pointers, one of which extends parallel to said ordinate axis and the other parallel to said abscissa axis, said pointers intersecting each other on the plane of said diagram and each being adjustable according to said horizontal distance or said level difference in the direction of that one of said co-ordinates which is transverse to said pointer, whereby the point of intersection is provided to define the determinative diagram values, and a linear guiding means for guiding each of said pointers, each linear guiding means being adjustable in a plane parallel to the plane of said diagram and in accordance with ballistic disturbing factors, each guiding means in adjusting position automatically effecting correction of the movement of the respective pointer in the respective adjusting direction in accordance with a displacement component corresponding to the respective disturbing factors whereby the normal setting of the point of intersection is shifted by a superimposed displacement vector which is the resultant of the two displacement components.

References Cited in the file of this patent

FOREIGN PATENTS

| 127,052 | Great Britain | May 25, 1919 |
| 207,184 | Great Britain | May 15, 1924 |

OTHER REFERENCES

Product Engineering, September and October 1949, "Mechanical Computing Mechanism," by Reid and Stromback. (Parts II and III, pp. 122 and 123 and pp. 126 and 127, respectively, relied on.)